(12) United States Patent
Kitagawa et al.

(10) Patent No.: US 6,278,496 B1
(45) Date of Patent: Aug. 21, 2001

(54) DIGITAL CORRECTION CIRCUIT AND IMAGE DATA PROCESSING APPARATUS EQUIPPED WITH A DIGITAL CORRECTION CIRCUIT

(75) Inventors: Makoto Kitagawa, Gifu; Mitsugu Kobayashi, Nagoya; Makoto Fujioka, Ogaki; Yusuke Tsutsui, Hashima; Hisao Uehara, Ogaki, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/168,773

(22) Filed: Oct. 8, 1998

(30) Foreign Application Priority Data

Oct. 9, 1997 (JP) .................................................. 9-276716
Dec. 17, 1997 (JP) .................................................. 9-347948

(51) Int. Cl.$^7$ ............................. H04N 5/202; H04N 9/69
(52) U.S. Cl. ....................... 348/674; 348/254; 348/671; 348/678; 348/687; 358/519; 345/87
(58) Field of Search ................................ 348/674, 254, 348/255, 687, 686, 671, 672, 673, 675, 678; 358/519, 521, 522, 523; 345/147, 89, 98, 87; H04N 5/202, 9/69

(56) References Cited

U.S. PATENT DOCUMENTS

| | | | |
|---|---|---|---|
| 5,408,267 | * 4/1995 | Main | 348/254 |
| 5,473,372 | * 12/1995 | Nobuoka et al. | 348/254 |
| 5,473,373 | * 12/1995 | Hwung et al. | 348/674 |
| 5,710,594 | * 1/1998 | Kim | 348/254 |
| 5,889,503 | * 3/1999 | Kikuchi et al. | 345/98 |
| 6,020,921 | * 2/2000 | Aleksic et al. | 348/254 |
| 6,160,532 | * 12/2000 | Kaburagi et al. | 348/674 |
| 6,166,781 | * 12/2000 | Kwak et al. | 348/674 |

* cited by examiner

Primary Examiner—Reinhard J. Eisenzopf
Assistant Examiner—Jean W. Désir
(74) Attorney, Agent, or Firm—Hogan & Hartson, LLP

(57) ABSTRACT

In the γ correction circuit, a crossover point arithmetic processing unit performs arithmetic processing for each region on crossover points y in the output data direction of a γ correction crossover line based on a plurality of slope data A respectively specified for each of a plurality of regions and crossover point positions X in the input data direction set in advance. A 5-to-4 encoder and a selector select one of a plurality of slope data A respectively specified for each of a plurality of regions and one result B of the results y of arithmetic processing on said crossover points based on the upper bits of input data, a flag encoder and another selector calculate the difference ΔX from a crossover point position in the input data direction to the input data in the region to which input data belongs, and an arithmetic processing unit multiples the above difference ΔX by the selected slope A, adds the multiplication result to the value of the selected crossover point position B in the output data direction, and outputs that value as a γ correction value. Consequently, even if the number of crossover lines for digital γ correction increases, arithmetic processing is simplified. When an image data processing apparatus is used, a pseudo gray scale processing circuit may be provided in a later stage of this γ correction circuit to decrease the number of data bits.

20 Claims, 10 Drawing Sheets

$A_x(A_0 \sim A_{11})$ : SLOPES
$y_x(y_0 \sim y_{11})$ : CROSSOVER POINT VALUES IN y AXIAL DIRECTION
$X_x(X_0 \sim X_{11})$ : CROSSOVER POINT VALUES IN X AXIAL DIRECTION $$Y11 = A0{<}{<}3 + A1{<}{<}3 + A2{<}{<}4 + A3{<}{<}4 + A4{<}{<}5 + A5{<}{<}5$$
$$+ A6{<}{<}6 + A7{<}{<}5 + A8{<}{<}4 + A9{<}{<}4 + A10{<}{<}3$$

with braces labeling the terms above as y1, y2-y1, y3-y2, y4-y3, y5-y4, y6-y5 and below as y7-y6, y8-y7, y9-y8, y10-y9, y11-y10.

Ax[7:0] — LOCATION OF DECIMAL POINT

Ax[7:0]<<3

Ax[7:0]<<4

Ax[7:0]<<5

Ax[7:0]<<8 yx(tmp)

THE 9th BIT AND BEYOND OF THE INTEGER PORTION ARE TREATED AS OVERFLOW, AND WHEN ANY OF THESE BITS ARE "1", ALL BITS HAVE A VALUE OF "1".

Bx

5 TO 4 ENCODER

| | XXXXX 98765 | SSSS EEEE LLLL 3210 |
|---|---|---|
| A0 | 00000 | 0000 |
| A1 | 00001 | 0001 |
| A2 | 00010 | 0010 |
|    | 00011 | 0010 |
| A3 | 00100 | 0011 |
|    | 00101 | 0011 |
| A4 | 00110 | 0100 |
|    | 00111 | 0100 |
|    | 01000 | 0100 |
|    | 01001 | 0100 |
| A5 | 01010 | 0101 |
|    | 01011 | 0101 |
|    | 01100 | 0101 |
|    | 01101 | 0101 |
| A6 | 01110 | 0110 |
|    | 01111 | 0110 |
|    | 10000 | 0110 |
|    | 10001 | 0110 |
|    | 10010 | 0110 |
|    | 10011 | 0110 |
|    | 10100 | 0110 |
|    | 10101 | 0110 |
| A7 | 10110 | 0111 |
|    | 10111 | 0111 |
|    | 11000 | 0111 |
|    | 11001 | 0111 |
| A8 | 11010 | 1000 |
|    | 11011 | 1000 |
| A9 | 11100 | 1001 |
|    | 11101 | 1001 |
| A10 | 11110 | 1010 |
| A11 | 11111 | 1011 |

Fig. 4

FLAG ENCODER

| | XXXXX<br>98765 | FFF<br>765 |
|---|---|---|
| A0 | 0 0 0 0 0 | 0 0 0 |
| A1 | 0 0 0 0 1 | 0 0 0 |
| A2 | 0 0 0 1 0<br>0 0 0 1 1 | 0 0 0<br>0 0 1 |
| A3 | 0 0 1 0 0<br>0 0 1 0 1 | 0 0 0<br>0 0 1 |
| A4 | 0 0 1 1 0<br>0 0 1 1 1<br>0 1 0 0 0<br>0 1 0 0 1 | 0 0 0<br>0 0 1<br>0 1 0<br>0 1 1 |
| A5 | 0 1 0 1 0<br>0 1 0 1 1<br>0 1 1 0 0<br>0 1 1 0 1 | 0 0 0<br>0 0 1<br>0 1 0<br>0 1 1 |
| A6 | 0 1 1 1 0<br>0 1 1 1 1<br>1 0 0 0 0<br>1 0 0 0 1<br>1 0 0 1 0<br>1 0 0 1 1<br>1 0 1 0 0<br>1 0 1 0 1 | 0 0 0<br>0 0 1<br>0 1 0<br>0 1 1<br>1 0 0<br>1 0 1<br>1 1 0<br>1 1 1 |
| A7 | 1 0 1 1 0<br>1 0 1 1 1<br>1 1 0 0 0<br>1 1 0 0 1 | 0 0 0<br>0 0 1<br>0 1 0<br>0 1 1 |
| A8 | 1 1 0 1 0<br>1 1 0 1 1 | 0 0 0<br>0 0 1 |
| A9 | 1 1 1 0 0<br>1 1 1 0 1 | 0 0 0<br>0 0 1 |
| A10 | 1 1 1 1 0 | 0 0 0 |
| A11 | 1 1 1 1 1 | 0 0 0 |

Fig. 5

DIGITAL CORRECTION CIRCUIT AND IMAGE DATA PROCESSING APPARATUS EQUIPPED WITH A DIGITAL CORRECTION CIRCUIT

BACKGROUND OF THE INVENTION

1. Field of the Invention

The present invention relates to a digital γ correction circuit that performs γ correction on digital brightness data and digital density data corresponding to the γ characteristics of LCDS, scanners, printers and so forth. Moreover, the present invention relates to an image data processing apparatus equipped with this type of γ correction circuit, contrast control circuit, brightness control circuit and so forth.

2. Description of the Prior Art

Known methods employed in the form of this type of digital γ correction circuit of the prior art include a method wherein converted values corresponding to the γ characteristics of an LCD, scanner, printer and so forth were stored in ROM in advance, after which digital brightness data or digital density data prior to correction was applied to ROM in the form of an address to perform γ correction, and a method wherein digital brightness data or digital density data X prior to correction was divided into a plurality of regions, after which an operation was performed on each region by an arithmetic processing circuit according to the following formula to perform γ correction.

$$Y = AX + B$$

where, Y is the output value and A is the slope of the crossover line for γ correction of each individual region.

However, in the method that uses ROM, increasing the number of correction curves requires a corresponding increase in the number of ROM, thereby resulting in problems such as increased costs and increased circuit area. Similarly, in the method that uses an arithmetic processing circuit, increasing the number of crossover lines for γ correction results in an increase in circuit size as well as longer processing time.

SUMMARY OF THE INVENTION

The present invention was completed to solve the above-mentioned problems, having the characteristics described below.

The present invention provides a digital γ correction circuit that corrects digital input data based on a γ correction crossover line to generate digital output data, which respectively fixes a plurality of crossover point positions in the input data axial direction of said γ correction crossover line in the form of fixed positions, is able to specify predetermined slope data respectively corresponding to a plurality of regions formed bordering on the fixed positions, comprising: a crossover point arithmetic processing circuit, which performs arithmetic processing on crossover point positions in the output data axial direction of said γ correction crossover line at each of said plurality of regions using said specified slope data and said fixed positions prior to input of said input data; and, a real-time processing circuit, which performs γ correction on a real-time basis on said input data based on crossover point positions in said output data axial direction arithmetically processed with said crossover point arithmetic processing circuit and said specified slope data to generate said corresponding output data.

In addition, in another aspect of the present invention, the present invention provides a digital γ correction circuit that corrects digital input data based on a γ correction crossover line to generate digital output data, which sets crossover point positions in the input data axial direction of said γ correction crossover line in advance, divides said γ correction crossover line into a plurality of regions bordering on each of said crossover point positions, comprising: a crossover point arithmetic processing circuit, which performs arithmetic processing on crossover point positions in the output data axial direction of said γ correction crossover line in each of said plurality of regions based on slope data respectively specified for each of said plurality of regions and crossover point positions in the axial direction of said input data set in advance; a first selection circuit, which selects one piece of slope data specified corresponding to each of said plurality of regions according to a predetermined upper bit of said input data; a second selection circuit, which selects one crossover point position in said output data axial direction arithmetically processed in said crossover point arithmetic processing circuit corresponding to each of said plurality of regions according to a predetermined upper bit of said input data; a difference calculation circuit, which calculates the difference from the crossover point position in said input data axial direction to the position in said input data axial direction in the region to which said input data belongs among said plurality of regions based on said input data; and an arithmetic processing circuit, which multiplies the difference calculated by said difference calculation circuit by slope data selected by said first selection circuit, adds the resulting multiplication result to the value of the crossover point position selected by said second selection circuit, and outputs the resulting addition result in the form of a γ correction value of said input data.

As has been explained above, according to the digital γ correction circuit as claimed in the present invention, since crossover point position Xx in the input data axial direction of a γ correction crossover line is taken to be a fixed position, and arithmetic processing of a crossover point in the output data axial direction, for which there is a larger volume of arithmetic processing, is performed prior to input of data, real-time processing during data input is faster and the circuit scale can be made to be smaller.

In addition, by selecting a plurality of slopes and a plurality of crossover point positions Yx in the output data axial direction corresponding to a predetermined upper bit of input data, arithmetic processing can be simplified.

In addition, in another aspect of the present invention, said crossover point arithmetic processing circuit performs arithmetic processing on said crossover point positions in the output data axial direction in said plurality of regions by bit-shifting slope data specified corresponding to each of said plurality of regions according to the size in said input data axial direction of said corresponding regions, and adding the shift result to crossover point positions in the output data axial direction of a previously determined adjacent region.

In this manner, arithmetic processing can be performed faster since crossover points in the output data axial direction of a γ correction crossover line are arithmetically processed by shifting a plurality of slope data respectively specified for each region for each bit according to the size of that region, and adding the shift results for each individual region.

Moreover, in yet another aspect of the present invention, said input data is a video signal, and said crossover point arithmetic processing circuit updates the arithmetic processing results that are output to arithmetic processing results to be output next during a vertical blanking period of said video signal.

If results are updated during this type of period, since there is no display during this blanking period, suitable γ correction processing can be performed on a real-time basis for each screen without having an effect on the display.

In addition, in still another aspect of the present invention, the present invention provides an image data processing circuit which is a γ correction circuit that performs γ correction processing on an integer n bits of image data that is input, and output "n+integer α" bits of image data when a is taken to be a positive integer, which respectively fixes a plurality of crossover point positions in the input data axial direction of said γ correction crossover line in the form of fixed positions, is able to specify predetermined slope data respectively corresponding to a plurality of regions formed bordering on the fixed positions, said circuit comprising: a crossover point arithmetic processing circuit, which performs arithmetic processing on crossover point positions in the output data axial direction of said γ correction crossover line at each of said plurality of regions using said specified slope data and said fixed positions prior to input of said input data; and, a real-time processing circuit, which performs γ correction on a real-time basis on said input data based on crossover point positions in said output data axial direction arithmetically processed with said crossover point arithmetic processing circuit and said specified slope data to generate said corresponding output data.

If an image data processing circuit is composed using a circuit that performs correction in this manner, correction data can be generated that is suitable for the characteristics of the display on a real-time basis, thereby making it possible to provide a display apparatus with high display quality at low cost.

In still another aspect of the present invention, an image data processing apparatus comprises: a γ correction circuit, which performs γ correction processing on integer n bits of image data that is input and outputs (n+positive integer α) bits of image data; and, a pseudo gray scale processing circuit, which performs pseudo gray scale processing on image data output from said γ correction circuit, and outputs (n+α−positive β) bits integer of image data.

In addition, in yet another aspect of the present invention the image data processing apparatus comprises: a first processing circuit which performs processing for contrast and/ or brightness control on original image data that is input; above γ correction circuit, and a pseudo gray scale processing circuit, wherein n bits of data output from said first processing circuit is supplied to said γ correction circuit.

In addition, another aspect of the present invention is to comprise a digital-analog (DA) converter that converts output image data of said pseudo gray scale processing circuit to an analog display signal.

In addition, in still another aspect of the present invention, said pseudo gray scale processing circuit performs an error diffusion type of pseudo gray scale processing which diffuses error data between input image data. In addition, in the present invention, said first processing circuit includes a contrast control circuit that performs contrast control by multiplying original image data by a predetermined multiplication value to output image data having a number of bits larger than said original image data.

According to the present invention, even if the number of bits of output image data becomes larger than the number of bits of original image data due to digital processing such as contrast control and γ correction, since it is possible to use that having the smaller number of bits as a DA converter connected in a later stage, a circuit can be realized that features low cost and low power consumption. Moreover, since pseudo gray scale processing is performed, good display quality can be secured.

In addition, even if the number of bits is decreased as a result of performing contrast control or pseudo gray scale processing following γ correction, any resulting decrease in display quality of the image can be suppressed as much as possible.

BRIEF DESCRIPTION OF THE DRAWINGS

FIG. 4 is a schematic illustration showing the processing of the 5-to-4 encoder of FIG. 1.

FIG. 5 is a schematic illustration showing the processing of the flag encoder of FIG. 1.

DESCRIPTION OF THE PREFERRED EMBODIMENTS

Embodiment 1

Figure 1:
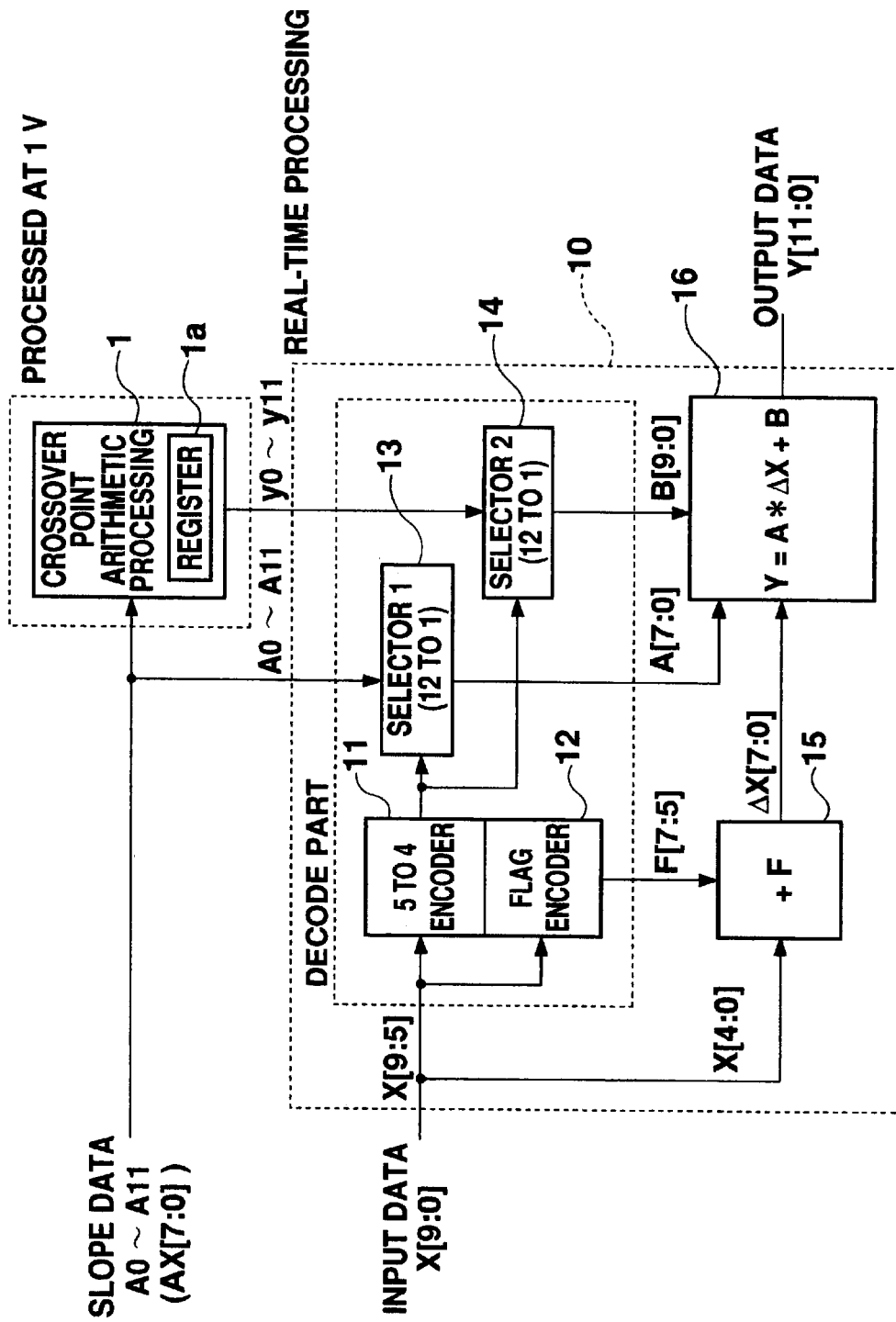
FIG. 1 is a block diagram showing one embodiment of a digital γ correction circuit according to the present invention.
Figure 2:
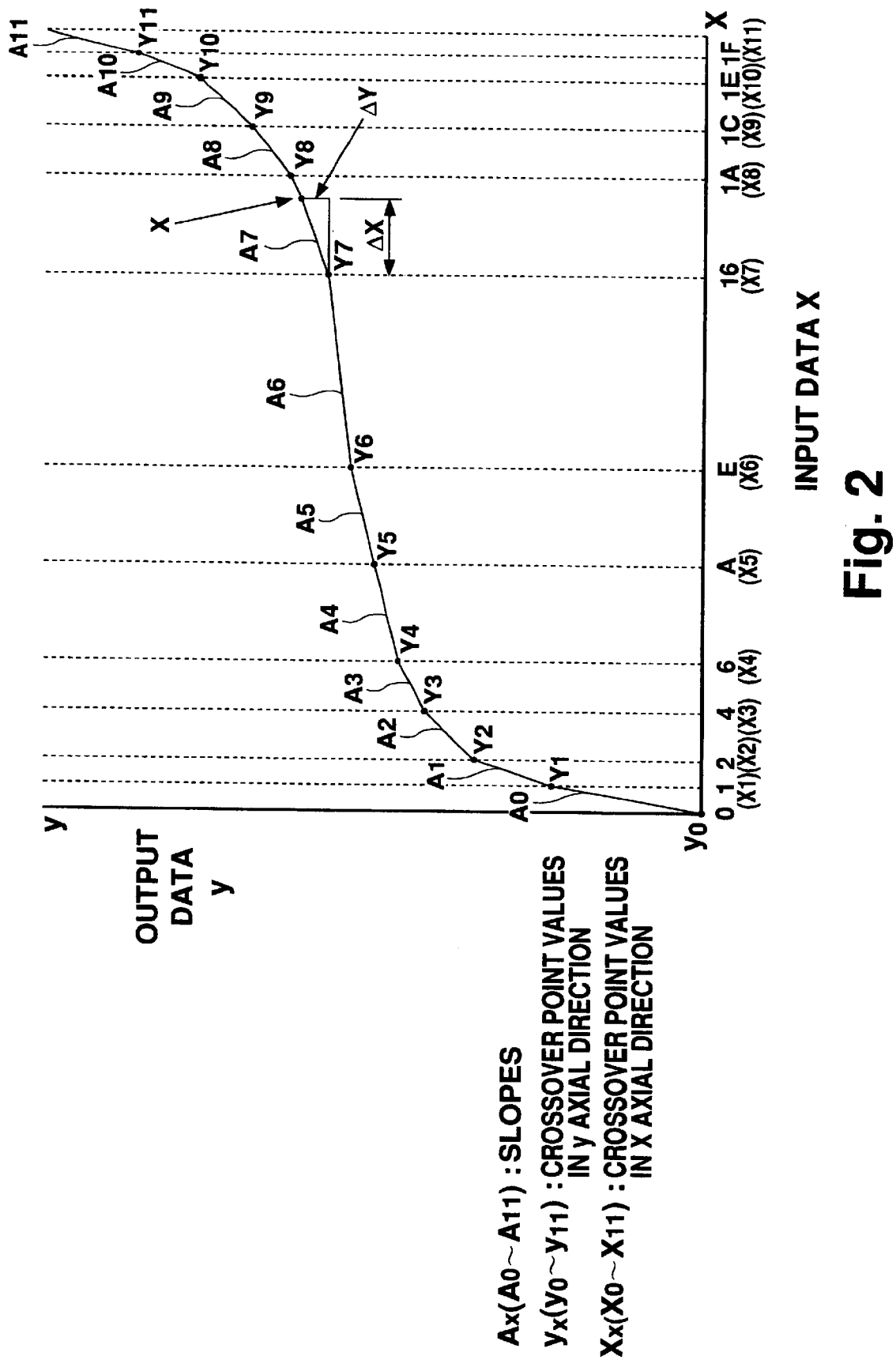
FIG. 2 is a schematic illustration showing the γ correction characteristics of the digital γ correction circuit of FIG. 1.
Figure 3:
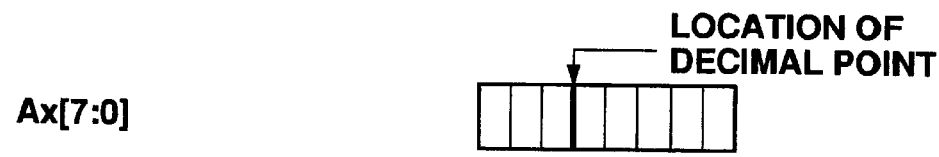
FIG. 3 is a schematic illustration showing the processing of the crossover point arithmetic processing unit of FIG. 1.
Figure 3:
Figure 3:
Figure 3:
Figure 3:
Figure 3:
Figure 3:
Figure 6:
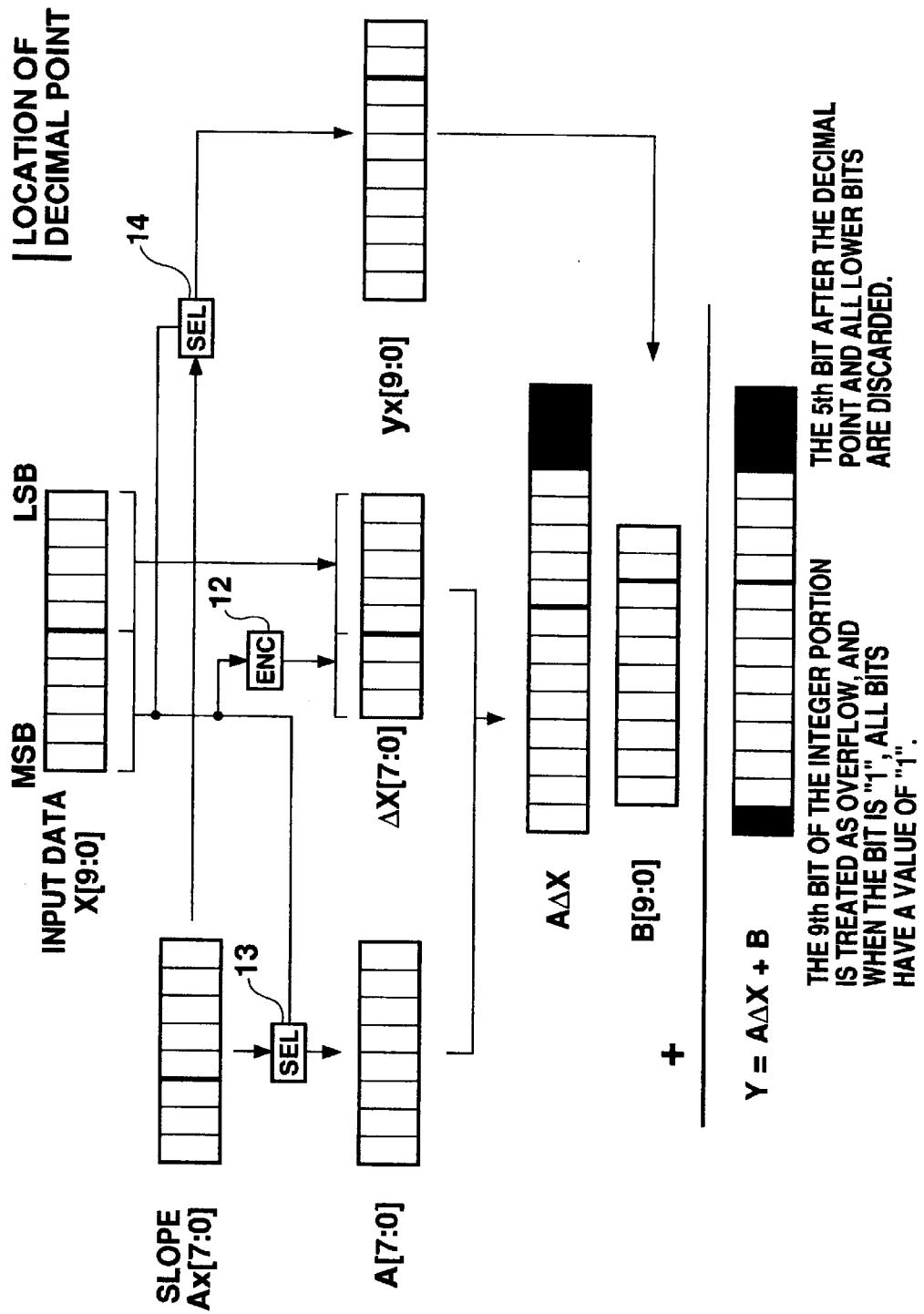
FIG. 6 is a schematic illustration showing the γ correction processing of the digital γ correction circuit of FIG. 1.

The following provides an explanation of a first embodiment of the present invention with reference to the drawings. FIG. 1 is a block diagram showing an embodiment of a digital γ correction circuit according to the present invention. FIG. 2 is a schematic illustration showing the γ correction characteristics of the digital γ correction circuit of FIG. 1. FIG. 3 is a schematic illustration showing the processing of the crossover point arithmetic processing unit of FIG. 1. FIG. 4 is a schematic illustration showing the processing of the 5-to-4 encoder of FIG. 1. FIG. 5 is a schematic illustration showing the processing of the flag encoder of FIG. 1. FIG. 6 is a schematic illustration showing the γ correction processing of the digital γ correction circuit of FIG. 1.

The digital γ correction circuit shown in FIG. 1 indicates an example of a constitution wherein 10 bits (integer portion: 8 bits, decimal portion: 2 bits) of digital brightness data X [9:0] are divided into 12 regions as shown in FIG. 2, and γ-converted into 12 bits (integer portion: 8 bits, decimal portion: 4 bits) of correction data Y [11:0] by 12 γ correction crossover lines (having slopes of A0 to A11 respectively) for correcting the γ characteristics of an LCD. Here, in FIG. 2, input value X is divided into 12 regions bordering on crossover points X1 through X11 in the X direction (input data axial direction) shown below. Furthermore, the semicolons (;) used to demarcate every 5 upper bits as shown below are shown for explaining the sub-regions to be explained later, these 5 upper bits describe values expressed in hexadecimal in the X direction of the drawing.

X1=00001;000,00 ("1" in the drawings)
X2=00010;000,00 ("2" in the drawings)
X3=00100;000,00 ("4" in the drawings)
X4=00110;000,00 ("6" in the drawings)
X5=01010;000,00 ("A" in the drawings)
X6=01110;000,00 ("E" in the drawings)
X7=10110;000,00 ("16" in the drawings)
X8=11010;000,00 ("1A" in the drawings)
X9=11100;000,00 ("1C" in the drawings)
X10=11110;000,00 ("1E" in the drawings)
X11=11111;000,00 ("1F" in the drawings)

Namely, each of these regions contains sub-regions as shown below so that intervals become narrower on bright and dark portions, and coarser at half tone portions in the manner of:

1 sub-region each of slopes A0 and A1,
2 sub-regions each of slopes A2 and A3,
4 sub-regions each of slopes A4 and A5,
8 sub-regions of slope A6,
4 sub-regions of slope A7,
2 sub-regions each of slopes A8 and A9, and
1 sub-region each of slopes A10 and A11, and is composed so that the width of each sub-region in the X direction is "1;000,00", or "8".

A0:
  "00000;000,00" to "00000;111,11"
A1:
  "00001;000,00" to "00001;111,11"
A2:
  "00010;000,00" to "00010;111,11"
  "00011;000,00" to "00011;111,11"
A3:
  "00100;000,00" to "00100;111,11"
  "00101;000,00" to "00101;111,11"
A4:
  "00110;000,00" to "00110;111,11"
  "00111;000,00" to "00111;111,11"
  "01000;000,00" to "01000;111,11"
  "01001;000,00" to "01001;111,11"
A5:
  "01010;000,00" to "01010;111,11"
  "01011;000,00" to "01011;111,11"
  "01100;000,00" to "01100;111,11"
  "01101;000,00" to "01101;111,11"
A6:
  "01110;000,00" to "01110;111,11"
  "01111;000,00" to "01111;111,11"
  "10000;000,00" to "10000;111,11"
  "10001;000,00" to "10001;111,11"
  "10010;000,00" to "10010;111,11"
  "10011;000,00" to "10011;111,11"
  "10100;000,00" to "10100;111,11"
  "10101;000,00" to "10101;111,11"
A7:
  "10110;000,00" to "10110;111,11"
  "10111;000,00" to "10111;111,11"
  "11000;000,00" to "11000;111,11"
  "11001;000,00" to "11001;111,11"
A8:
  "11010;000,00" to "11010;111,11"
  "11011;000,00" to "11011;111,11"
A9:
  "11100;000,00" to "11100;111,11"
  "11101;000,00" to "11101;111,11"
A10:
  "11110;000,00" to "11110;111,11"
A11:
  "11111;000,00" to "11111;111,11"

Each piece of slope data A0 through A11 is applied in the form of 8-bit data Ax [7:0], composed of a 3-bit integer portion and 5-bit decimal portion, corresponding to the 12 regions described above from an operating unit (not shown) to a crossover point arithmetic processing unit 1 and a selector 13 shown in FIG. 1, 25 and each boundary point (each crossover point of a γ correction line in the input data axial direction) X1 through X11 of the 12 regions mentioned above is set in advance in the crossover point arithmetic processing unit 1.

Next, the crossover point arithmetic processing unit 1 calculates the 11 crossover point values Y1 through Y11 in the y direction shown in FIG. 2 (output data axial direction) based on these slope data A0 through A11 and each boundary point X1 through X11 of the 12 regions during the time of 1 screen (1 V) of an LCD image, stores them in a register 1a, and either continues from the first pixel of the next screen, or outputs them to a selector 14 until the next slope is set. Here, since the input data is in the form of a video signal, the contents of the register 1a are rewritten to its vertical blanking period. Each of these crossover point values y1 through y11 are in the form of 10-bit data Y[9:0] composed of an 8-bit integer portion and a 2-bit decimal portion.

Here, 8-bit slope data Ax [7:0] is composed of a 3-bit integer portion and 5-bit decimal portion as shown in FIG. 3. Thus, in the case slope has a decimal value of 1, slope data Ax [7:0] is expressed as "001,00000". In addition, in the case slope has a decimal value of 2, slope data Ax [7:0] is expressed as "010,00000", and in the case slope has a decimal value of ½, slope data Ax [7:0] is expressed as "000,10000".

Therefore, the first crossover point value y1 shown in FIG. 2 can be determined by multiplying slope A0 by the width of one sub-region since the region of slope A0 is composed of one sub-region. Since the width of such one sub-region is "11000" ("8") as previously described, multiplying "1000" by slope is determined by shifting the slope three bits towards the most significant bit (MSB) side. Accordingly, this can be determined by shifting slope data A0 [7:0] by three bits towards the MSB side as shown in FIG. 3 (A0 in the drawing<<3). For example, in the case slope=2 (decimal)=010,00000, shifting this three bits towards MSB side results in the following:

y1=010000,00 thereby becoming the value obtained by doubling the first boundary point in the X axial direction, X1=00001000,00, described above. In addition, in the case, for example, slope=½ (decimal)=000,10000, shifting this three bits towards MSB side results in the following:

y1=000100,00 thereby becoming the value obtained by halving the first boundary point in the X axial direction, X1=00001000,00 described above.

Similarly, y2−y1 can be determined by shifting slope data A1 [7:0] three bits towards MSB side since the region of slope A1 is composed of one sub-region, and the second boundary point y2 can be determined by adding the above-mentioned y1.

Next, for y3−y2, slope data A2 [7:0] should be similarly shifted three bits towards MSB side, and that value should then be doubled i.e. increased by the amount of one more bit instead of doubling since the region of A2 is composed of two sub-regions. In other words, it can be determined by shifting slope data A2 [7:0] by four bits towards MSB side, and the third boundary point y3 can be determined by adding the above-mentioned y2. Similarly, the above difference composed of two sub-regions can be determined by shifting slope data Ax [7:0] by four bits towards MSB side, the above difference composed of four sub-regions can be determined by shifting slope data Ax [7:0] by five bits towards NSB side, and the above difference composed of eight sub-regions can be determined by shifting slope data Ax [7:0] by 6 bits towards MSB side. However, starting with the $9^{th}$ bit of the integer portion, all values are treated as overflow and a value of all 1=3 s results whenever any of these bits is "1".

In the constitution shown in FIG. 1, the upper five bits X [9:5] of the 10-bit input data X [9:0] are applied to 5-to-4 encoder 11 and flag encoder 12, while the lower five bits X [4:0] are applied to adder 15. As shown in FIG. 4, the 5-to4 encoder 11 decodes signals that indicate which region of the above-mentioned 12 regions (slopes A0 through A11 in the drawings), namely 4-bit slope selection signals SEL 3 to 0, based on the upper five bits X [9:5], and outputs them to selectors 13 and 14.

Here, with reference to FIG. 2, since the region of the input data of slope A4, for example, is from "00110;000,00" ("6" in the drawing) to "01001;111,11" (immediately prior to "A" in the drawing), when the upper five bits X [9:5] of the input data are:

"00110"
"00111"
"01000"
"01001"

as shown in FIG. 4, slope select signals SEL 3 to 0 are all "0100".

The selector 13 selects one A [7:0] of slope data A0 through A11 based on these slope selection signals SEL 3 to 0, and outputs this A to arithmetic processing unit 16 as slope A of γ correction crossover line Y=A * ΔX+B. In addition, the selector 14 selects one crossover point value among crossover point values y0 to y11 arithmetically processed by the crossover point arithmetic processing unit 1 based on these slope selection signals SEL 3 to 0, and then outputs this selected crossover point value to arithmetic processing unit 16 in the form of γ correction crossover line Y=A * ΔX+B.

In addition, as shown in FIG. 5, flag encoder 12 encodes a signal that indicates which sub-region of the above-mentioned 12 regions based on the upper 5 bits X [9:5], namely a 3-bit flag F [7:5], and outputs it to the adder 15. Here, with reference to FIG. 2, since the region of the input data of slope A4, for example, is from "00110;000,00" ("6" in the drawing) to "01001;111,11" (immediately prior to "A" in the drawing), flag F [7:5] output from the flag encoder 12 are as follows when the upper 5 bits X [9:5] of the input data are as indicated below:

"000": first sub-region when "00110"
"001": second sub-region when "00111"
"010": third sub-region when "01000"
"011": fourth sub-region when "01001"

as shown in FIG. 5. Said 5-to-4 encoder 11 and flag encoder 12 can be composed by a logic circuit or ROM.

The adder 15 generates 8-bit data ΔX [7:0] using above flag F [7:5] as being the upper 3 bits of 8-bit data ΔX [7:0], and the lower 5 bits X [4:0] of the 10-bit input data X [9:0] as being the lower 5 bits of 8-bit data ΔX [7:0]. This data ΔX [7:0] is then output to the processing unit 16 as ΔX of γ correction crossover line Y=A*ΔX+B. Namely, this 8-bit data ΔX [7:0] is the distance from one of crossover point values X1 through X11 in the X direction with respect to the region among which the input data X belongs to the position of the input data X. Here, the adder 15 is not a processor, but can be easily understood to be able to be configured simply with an 8-bit bus and so forth.

The arithmetic processing unit 16 is composed of a product-sum processor. This arithmetic processing unit 16 calculates 12-bit (integer portion: 8 bits, decimal portion: 4 bits) γ correction data based on the value of ΔX [7:0] from crossover points X1 through X11 in the X direction with respect to the previous region calculated by the adder 15, slope A [7:0] selected by the selector 3, crossover point values y1 through y11=B in the y direction with respect to the previous region selected by the selector 14, and the following equation:

$$Y=A*\Delta X+B$$

and outputs it to an LCD. Here, in the case the arithmetic processing unit 16 arithmetically processes the above equation, as shown in FIG. 6, the $9^{th}$ bit and beyond of the integer portion of the processing result are treated as overflow, and in the case of "1", all 12 bits have a value of "1". In addition, the $5^{th}$ bit after the decimal point and all lower bits are discarded so that the processing result is in the form of a 12-bit output.

Namely, in the above constitution, following input of slope data A0 through A11, the crossover point arithmetic processing unit 1 calculates 11 crossover point values y1 through y11 in the y direction during the time of 1 screen (1 V) of an LCD image, and continues to output those values to the selector 14 starting with the next screen. In contrast, the 5-to-4 encoder 11, flag encoder 12, selectors 13 and 14, adder 15 and arithmetic processing unit 16 perform real-time processing on the input data.

Figure 7:
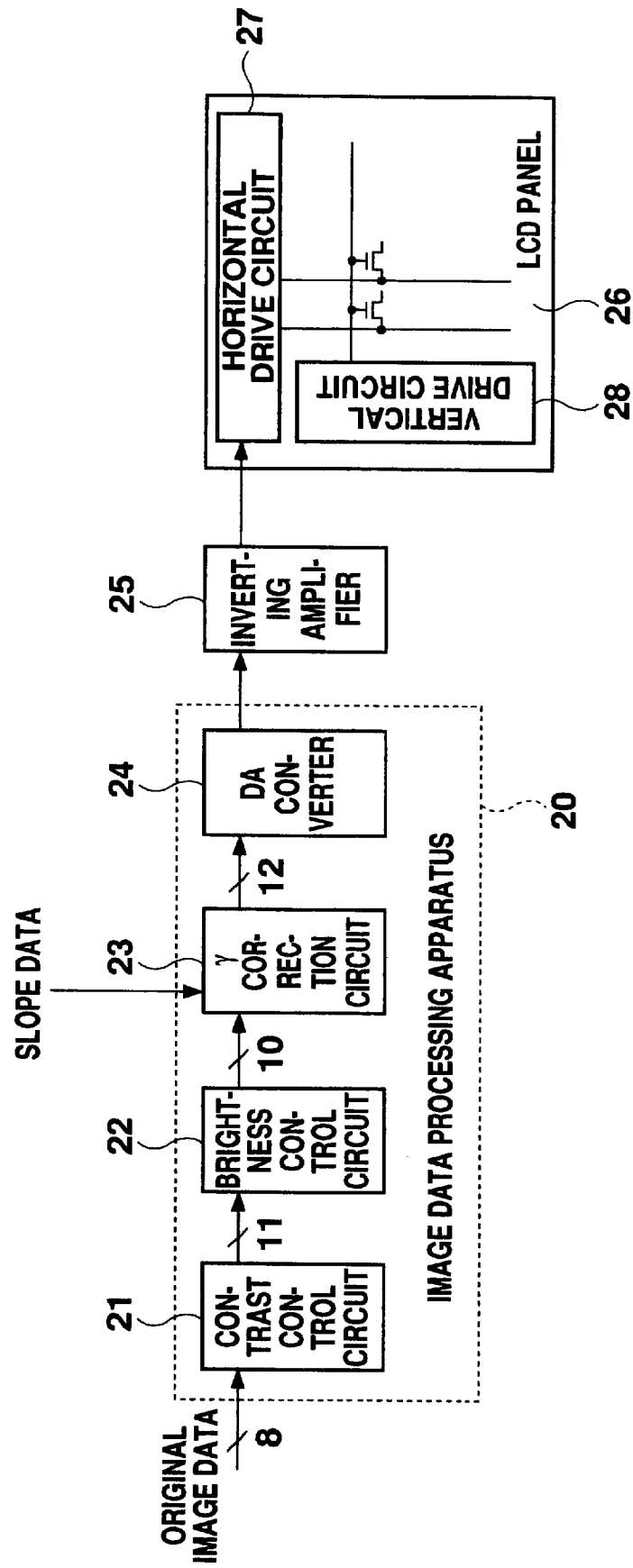
FIG. 7 is a block diagram showing the configuration of an image data processing apparatus using the γ correction circuit.

A digital γ correction circuit like that explained above can be used in an image data processing apparatus as shown in FIG. 7.

This image data processing apparatus 20 performs various types of digital signal processing on original image data that is input, and outputs the resulting image data to a color LCD display apparatus in the form of a display signal. Furthermore, although the apparatus here employs a constitution in which 8-bit original image data is input for each of the colors of red, green and blue, enabling full-color display using a total of 16,700,000 colors, the processing configuration for only 1 color is shown in FIG. 7. In actuality, the processing configuration shown in FIG. 7 exists for each of the colors of red, green and blue.

In FIG. 7, image data processing apparatus 20 is composed of contrast control circuit 21, which controls contrast by expanding the dynamic range of 8-bit original image data, brightness control circuit 12, which controls brightness by applying a predetermined offset to image data output from the contrast control circuit 21, γ correction circuit 23 like that described above, which performs γ correction processing on image data output from the brightness control circuit 22, and DA converter 24, which converts corrected image data output from the γ correction circuit 23 into analog display signals.

Next, analog display signals output from the DA converter 24 are amplified with inverting amplifier 25, which inverts the signals for every horizontal interval and every vertical interval and then outputs the inverted signals, and supplied to LCD panel 26. This LCD panel 26 is equipped with a built-in horizontal drive circuit 27 and vertical drive circuit 28. Analog display signals from the inverting amplifier 25 are input to the horizontal drive circuit 27, after which they are supplied to a pixel electrode by way of a switching element in the form of a TFT.

As has been described above, by using the γ correction circuit 23 according to the present invention, γ correction can be performed on 10-bit data, for example, supplied from the brightness control circuit 22 on a real-time basis, and that data can then be supplied to the DA converter 24 in the form of 12-bit corrected data. Consequently, suitable γ correction can be performed without increasing the overall circuit size of the image data processing circuit 20, thereby allowing generation of image data for, for example, an LCD display apparatus.

Embodiment 2

Since the contrast control circuit 21 shown in FIG. 7 performs processing for expanding dynamic range, the number of bits of output data becomes, for example, 11 bits, which is larger than the number of bits, "8", of the original image data. In addition, since the γ correction circuit 23 performs γ correction on input data according to an approximation method using a γ correction crossover line as previously described, the number of bits increases here as well, becoming, for example, 12 bits.

In this manner, when contrast control and γ correction processing are performed on original image data, the final number of output bits becomes larger than the number of bits of the original image data, and in order to convert this type of digital image data to an analog display signal, a DA converter must be used that has a larger number of bits. Thus, in addition to resulting in increased power consumption and costs, the circuit area ends up becoming larger in the case of forming an IC. Therefore, although it has been considered to reduce the number of bits of the input data or γ correction data in order to decrease the number of bits of the DA converter, the quality of the displayed image ends up decreasing in such cases.

A second embodiment of the present invention solves these problems by providing a preferable constitution of an image data processing apparatus that enables a simpler circuit configuration without lowering the quality of images displayed on a panel, while also realizing an apparatus having low cost and low power consumption, an example of which is explained below.

Figure 8:
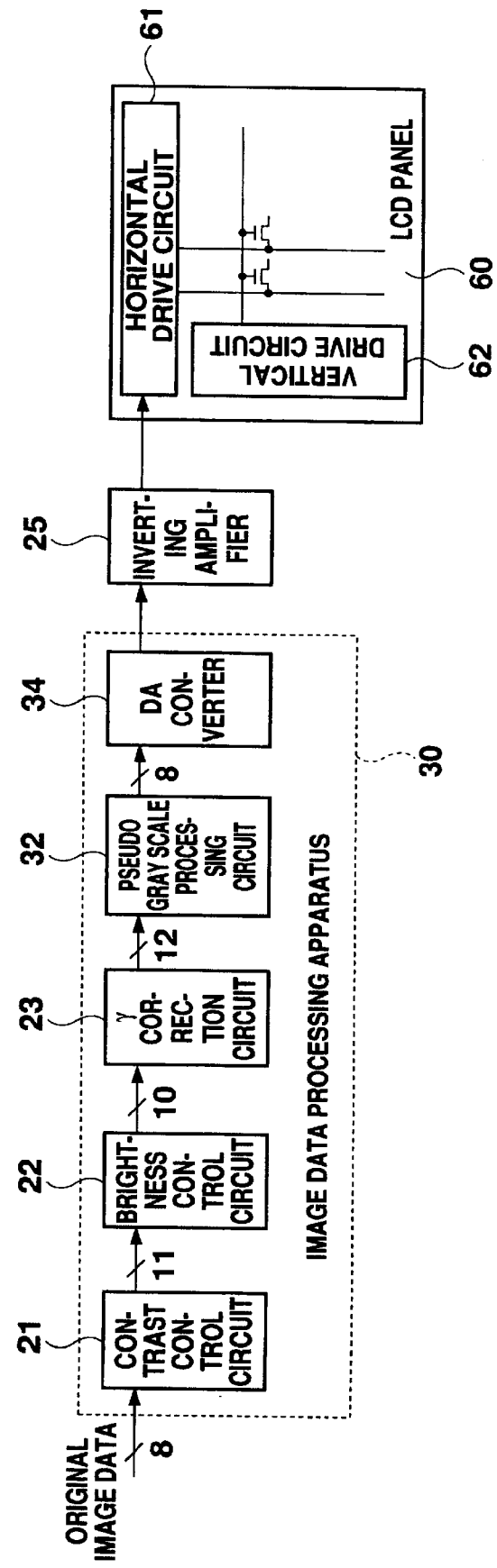
FIG. 8 is a block diagram showing the configuration of an image data processing apparatus according to a second embodiment of the present invention.

FIG. 8 is a block diagram showing the constitution of a second embodiment of the present invention. Although a constitution is employed that allows full-color display using a total of 16,700,000 colors, in the same manner as FIG. 7, an image data processing apparatus is shown for only one of three colors (R, G, B). Furthermore, the same reference numerals are used for the constitution in FIG. 8 that correspond to those used in FIG. 7.

Image data processing apparatus 30 is composed of contrast control circuit 21, which controls contrast by expanding the dynamic range of 8-bit original image data, brightness control circuit 22, which controls brightness by applying a predetermined offset to image data output from the contrast control circuit 21, γ correction circuit 23 as shown in, for example, a first embodiment of the present invention, which performs γ correction processing on image data output from the brightness control circuit 22, pseudo gray scale processing circuit 32, which performs pseudo gray scale processing on corrected image data output from γ correction circuit 23, and DA converter 34, which converts image data artificial contrast processed to analog display signals. Analog display signals output from the DA converter 34 are supplied to LCD panel 60 by way of inverting amplifier 25 in the same way as in FIG. 7, and then supplied to a pixel electrode by way of a switching element in the form of a TFT by horizontal drive circuit 61 contained within the panel 60.

Figure 9:
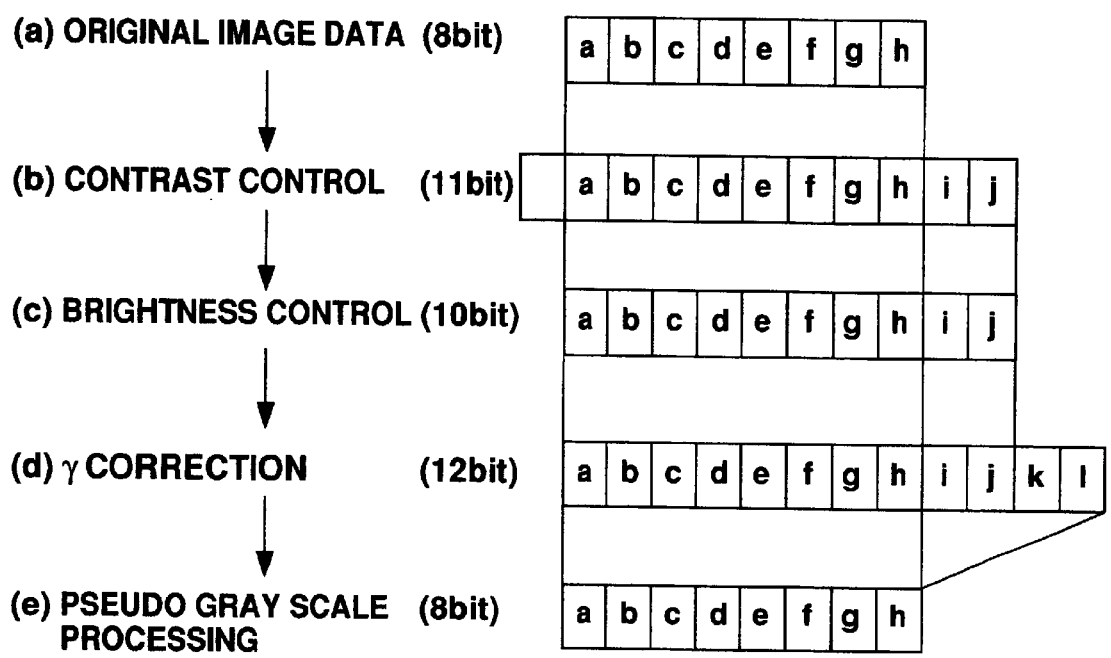
FIG. 9 is a schematic illustration showing output image data of each block in the second embodiment of the present invention.

More specifically, the contrast control circuit 21 employs a constitution that expands dynamic range by multiplying 8-bit original image data by a predetermined multiplication factor, and as shown in FIG. 9 (a) and (b), the number of data bits after processing is 11. The brightness control circuit 22 employs a constitution that adds a predetermined offset by adding a predetermined value to image data output from the contrast control circuit 21, while also performing processing that sets upper and lower limits for data that exceeds upper and lower limit values to set the data range within a predetermined range to make the number of data bits after processing 10 bits as shown in FIG. 9 (c). As a result of the above processing, the number of image data bits becomes larger than the 8 bits of the original image data.

Next, as shown in the above-mentioned FIG. 2, the γ correction circuit 23 is composed of a circuit that performs processing by which a Δ curve is approximated to a crossover line, and input data is converted to output data in accordance with this crossover line, and comprises a constitution like that shown, for example, in FIG. 1. Generally speaking, a γ curve is approximated by a plurality of crossover lines, and together with setting the slope Ax of each crossover line, intercept yx of the y axis which is the output data axis determined by arithmetic processing, in register 1a in advance, input data X is evaluated as to which belongs to any region divided by each crossover point Xx with a decode part. According to the results of this evaluation, the slope and Y intercept of the region to which the input data belongs are selected, and input data X (actually ΔX) is multiplied by the selected slope with the arithmetic processor 16 to obtain γ-corrected output data Y by adding y intercept (B) to that result. In this manner, when correction is performed on input data based on a crossover line, the number of output data bits becomes greater than the number of input data bits, becoming 12 bits in this example (see FIG. 9 (d)).

Figure 10:
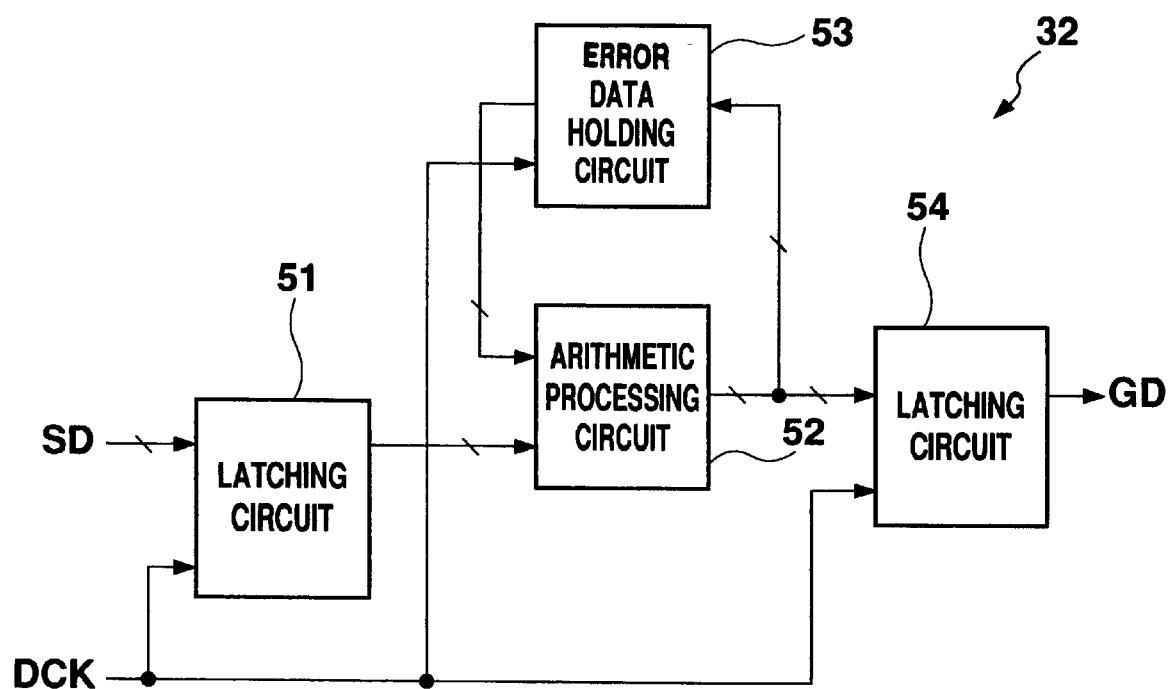
FIG. 10 is a circuit diagram showing the configuration of a pseudo gray scale processing circuit according to the second embodiment of the present invention.

Pseudo gray scale processing circuit 32, which is characteristic to this second embodiment of the present invention, is, more specifically, a circuit that performs an error diffusion type of pseudo gray scale processing which diffuses error data between input image data, and is composed as shown in FIG. 10. To begin with, latching circuit 51 latches 12-bit image data SD sequentially input from a γ correction circuit in synchronization with dot clock DCK, and outputs that data to arithmetic processing circuit 52. The arithmetic processing circuit 52 adds error data held in error data holding circuit 53 to the latched 12-bit image data to generate 12-bit corrected image data. The error data holding circuit 53 holds the lower 4 bits of 12-bit corrected image data in synchronization with the dot clock and outputs error data to an arithmetic processing circuit when image data of the next pixel is latched by the latching circuit 51. The upper 8 bits of 12-bit corrected image data are latched by latching circuit 54 in synchronization with the dot clock followed by output of this 8-bit image data GD.

In other words, the lower 4 bits of image data are diffused in the form of error data among the 8-bit image data of the adjacent pixel, thereby making it possible to display intermediate gradation by taking the average of brightness of a plurality of pixels.

As has been described above, in the image data processing apparatus 30, the number of output data bits is increased to 10 bits with the contrast control circuit 2 and brightness control circuit 3 as shown in FIG. 9 (*b*) and (*c*), which is greater than the number of data bits, "8", of the original image data. Moreover, the number of output bits is increased to 12 bits with the γ correction circuit 23. However, since the 12-bit image data is decreased to 8 bits by the pseudo gray scale processing circuit provided after the γ correction circuit 23, as a DA converter 34 following it is possible to employ one that processes 8-bit data. Moreover, not only is the number of bits simply decreased, but display quality can be obtained that is nearly equal to that in the case of using a 12-bit DA converter because the image data that is output contains a component of the adjacent image data.

In addition, in this second embodiment, decreases in display quality are suppressed as much as possible by performing contrast control and pseudo gray scale processing after γ correction processing in particular.

Furthermore, although the explanation of the second embodiment of the present invention described above uses the example of the case of using the circuit explained in the first embodiment for the γ correction circuit, the constitution of this embodiment is not necessarily limited to using a γ correction circuit like that in the first embodiment. Even in the case of using a different type of γ correction circuit, the number of bits can be decreased by processing output data from a γ correction circuit that has increased the number of bits to a number greater than that of the original image data with a pseudo gray scale processing circuit, thereby realizing a circuit having a smaller number of bits and lower costs for the DA converter used in a later stage.

What is claimed is:

1. A digital γ correction circuit that corrects digital input data based on a γ correction crossover line to generate digital output data, which respectively fixes a plurality of crossover point positions in the input data axial direction of said γ correction crossover line in the form of fixed positions, is able to specify predetermined slope data respectively corresponding to a plurality of regions formed bordering on the fixed positions, said circuit comprising:

a crossover point arithmetic processing circuit, which performs arithmetic processing on crossover point positions in the output data axial direction of said γ correction crossover line at each of said plurality of regions using said specified slope data and said fixed positions prior to input of said input data;

and, a real-time processing circuit, which performs γ correction on a real-time basis on said input data based on crossover point positions in said output data axial direction arithmetically processed with said crossover point arithmetic processing circuit and said specified slope data to generate said corresponding output data.

2. A digital γ correction circuit as set forth in claim 1 wherein, said crossover point arithmetic processing circuit performs arithmetic processing on said crossover point positions in the output data axial direction in said plurality of regions by bit-shifting slope data specified corresponding to each of said plurality of regions according to the size in the input data axial direction of said corresponding regions, and adding the shift result to crossover point positions in the output data axial direction of a previously determined adjacent region.

3. A digital γ correction circuit as set forth in claim 1 wherein, said input data is a video signal, and said crossover point arithmetic processing circuit updates the arithmetic processing results that are output to arithmetic processing results to be output next during a vertical blanking period of said video signal.

4. A digital γ correction circuit as set forth in claim 1 wherein, said real-time processing circuit comprises:

a first selection circuit, which selects one piece of slope data specified corresponding to each of said plurality of regions according to a predetermined upper bit of said input data;

a second selection circuit, which selects one crossover point position in said output data axial direction arithmetically processed in said crossover point arithmetic processing circuit corresponding to each of said plurality of regions according to a predetermined upper bit of said input data;

a difference calculation circuit, which calculates the difference from the crossover point position in said input data axial direction to the position in said input data axial direction in the region to which said input data belongs among said plurality of regions based on said input data;

and an arithmetic processing circuit, which multiplies a difference calculated by said difference calculation circuit by slope data selected by said first selection circuit, adds a resulting multiplication result to a value of the crossover point position selected by said second selection circuit, and outputs the resulting addition result in the form of a γ correction value of said input data.

5. A digital γ correction circuit as set forth in claim 4 wherein, said crossover point arithmetic processing circuit performs arithmetic processing on said crossover point positions in the output data axial direction in said plurality of regions by bit-shifting slope data specified corresponding to each of said plurality of regions according to the size in the input data axial direction of said corresponding regions, and adding the shift result to crossover point positions in the output data axial direction of a previously determined adjacent region.

6. A digital γ correction circuit as set forth in claim 4 wherein, said input data is a video signal, and said crossover point arithmetic processing circuit updates the arithmetic processing results that are output to arithmetic processing results to be output next during a vertical blanking period of said video signal.

7. A digital γ correction circuit that corrects digital input data based on a γ correction crossover line to generate digital output data, which sets crossover point positions in the input data axial direction of said γ correction crossover line in advance, divides said γ correction crossover line into a plurality of regions bordering on each of said crossover point positions, said circuit comprising:

a crossover point arithmetic processing circuit, which performs arithmetic processing on crossover point positions in the output data axial direction of said γ correction crossover line in each of said plurality of regions based on slope data respectively specified for each of said plurality of regions and crossover point positions in the axial direction of said input data set in advance;

a first selection circuit, which selects one piece of slope data specified corresponding to each of said plurality of regions according to a predetermined upper bit of said input data;

a second selection circuit, which selects one crossover point position in said output data axial direction arithmetically processed in said crossover point arithmetic processing circuit corresponding to each of said plurality of regions according to a predetermined upper bit of said input data;

a difference calculation circuit, which calculates the difference from the crossover point position in said input data axial direction to the position in said input data axial direction in the region to which said input data belongs among said plurality of regions based on said input data; and, an arithmetic processing circuit, which multiplies a difference calculated by said difference calculation circuit by slope data selected by said first selection circuit, adds a resulting multiplication result to a value of the crossover point position selected by said second selection circuit, and outputs the resulting addition result in the form of a γ correction value of said input data.

8. A digital γ correction circuit as set forth in claim 7 wherein, said crossover point arithmetic processing circuit performs arithmetic processing on said crossover point positions in the output data axial direction in said plurality of regions by bit-shifting slope data specified corresponding to each of said plurality of regions according to the size in the input data axial direction of said corresponding regions, and adding the shift result to crossover point positions in the output data axial direction of a previously determined adjacent region.

9. A digital γ correction circuit as set forth in claim 7 wherein, said input data is a video signal, and said crossover point arithmetic processing circuit updates the arithmetic processing results that are output to arithmetic processing results to be output next during a vertical blanking period of said video signal.

10. A digital γ correction circuit that corrects digital input data based on a γ correction crossover line to generate digital output data, which sets crossover point positions Xx in the input data axial direction of said γ correction crossover line in advance, divides said γ correction crossover line into a plurality of regions bordering on each of said crossover point positions Xx, said circuit comprising:

a crossover point arithmetic processing circuit, which performs arithmetic processing on crossover point positions yx in the output data axial direction of said γ correction crossover line in each of said plurality of regions based on slope data Ax are specified corresponding to each of said plurality of regions and said crossover point positions Xx in the axial direction of said input data set in advance;

a first selection circuit, which selects slope data Ax corresponding to a region to which said input data belongs among said specified slope data Ax according to a predetermined upper bit of said input data;

a second selection circuit, which selects crossover point position yx corresponding to a region to which said input data belongs among crossover point positions yx in said output data axial direction arithmetically processed in said crossover point arithmetic processing circuit according to a predetermined upper bit of said input data;

a difference calculation circuit, which calculates the difference ΔX from the crossover point position Xx in said input data axial direction to the position in said input data axial direction in the region to which said input data belongs among said plurality of regions based on said input data; and, an arithmetic processing circuit, which multiplies the difference ΔX calculated by said difference calculation circuit by slope data Ax selected by said first selection circuit, adds a resulting multiplication result to the value B of the crossover point position selected by said second selection circuit, and outputs the resulting addition result in the form of a γ correction value of said input data.

11. An image data processing circuit which is a γ correction circuit that performs γ correction processing on an integer n bits of image data that is input, and outputs "n+integer α" bits of image data when α is taken to be a positive integer, which respectively fixes a plurality of crossover point positions in the input data axial direction of said γ correction crossover line in the form of fixed positions, is able to specify predetermined slope data respectively corresponding to a plurality of regions formed bordering on the fixed positions, said circuit comprising:

a crossover point arithmetic processing circuit, which performs arithmetic processing on crossover point positions in the output data axial direction of said γ correction crossover line at each of said plurality of regions using said specified slope data and said fixed positions prior to input of said input data; and, a real-time processing circuit, which performs γ correction on a real-time basis on said input data based on crossover point positions in said output data axial direction arithmetically processed with said crossover point arithmetic processing circuit and said specified slope data to generate said corresponding output data.

12. An image data processing circuit as set forth in claim 11, said circuit further comprising a pseudo gray scale processing circuit that performs pseudo gray scale processing on image data after γ correction processed and output from said γ correction circuit, and outputs "n+α-β" bits of image data when β is taken to be a positive integer.

13. An image data processing circuit as set forth in claim 12, said circuit further comprising a digital-analog converter that converts image data output from said pseudo gray scale processing circuit to analog display signals.

14. An image data processing circuit as set forth in claim 11, said circuit further comprising a first processing circuit and a pseudo gray scale processing circuit, wherein said first processing circuit performs contrast control and/or brightness control on input original image data and supplies said processed data to said γ correction circuit, and said pseudo gray scale processing circuit performs pseudo gray scale processing on image data γ correction processed and output from said γ correction circuit and outputs "n+α-β" bits of image data when β is taken to be a positive integer.

15. An image data processing circuit as set forth in claim 14, said circuit further comprising a digital-analog converter that converts image data output from said pseudo gray scale processing circuit to analog display signals.

16. An image data processing apparatus comprising:

a γ correction circuit, which performs γ correction processing on integer n bits of image data that is input and outputs "n+positive integer α" bits of image data; and, a pseudo gray scale processing circuit, which performs pseudo gray scale processing on image data output from said γ correction circuit, and outputs "n+β–β" bits of image data when β is taken to be a positive integer.

17. An image data processing apparatus as set forth in claim 16, said circuit further comprising a digital-analog converter that converts image data output from said pseudo gray scale processing circuit to analog display signals.

18. An image data processing apparatus as set forth in claim 16, wherein said pseudo gray scale processing circuit performs an error diffusion type of pseudo gray scale processing which diffuse s error data between input image data.

19. An image data processing apparatus as set forth in claim 16, said circuit further comprising a first processing circuit which performs contrast control and/or brightness control on input original image data, wherein n bits of data output from said first processing circuit is supplied to said γ correction circuit.

20. An image data processing apparatus as set forth in claim 19, wherein said first processing circuit comprises a contrast control circuit that performs contrast control by multiplying original image data by a predetermined multiplication value, and outputs image data having a number of bits larger than said original image data.

* * * * *

UNITED STATES PATENT AND TRADEMARK OFFICE
CERTIFICATE OF CORRECTION

PATENT NO.   : 6,278,496 B1  
DATED        : August 21, 2001  
INVENTOR(S)  : Kitagawa et al.

It is certified that error appears in the above-identified patent and that said Letters Patent is hereby corrected as shown below:

Column 1,
Line 54, change "Digital Correction Circuit and Image Data Processing Apparatus Equipped with a Digital Correction Circuit" to -- "Digital $\gamma$ Correction Circuit and Image Data Processing Apparatus Equipped with a Digital $\gamma$ Correction Circuit." --.

Signed and Sealed this

Fifth Day of March, 2002

Attest:

JAMES E. ROGAN
*Director of the United States Patent and Trademark Office*

*Attesting Officer*